United States Patent [19]
Abril

[11] Patent Number: 6,004,470
[45] Date of Patent: Dec. 21, 1999

[54] APPARATUS AND METHOD FOR COOLANT/TRAMP OIL SEPARATION

[76] Inventor: Tim Abril, 302 W. Medlock, Phoenix, Ariz. 85013

[21] Appl. No.: 09/225,106

[22] Filed: Jan. 4, 1999

[51] Int. Cl.$^6$ .............................. C02F 1/40; E02B 15/00; B01D 17/00; B01D 19/00; B01D 17/02

[52] U.S. Cl. .......................... 210/776; 210/799; 210/801; 210/805; 210/806; 210/168; 210/171; 210/188; 210/196; 210/472; 210/510.1; 210/519; 210/532.1; 210/539; 210/416.5; 210/776; 96/215; 96/220; 95/243; 95/262

[58] Field of Search ...................................... 210/776, 799, 210/800, 801, 805, 806, 168, 171, 188, 196, 472, 510.1, 519, 532.1, 539, 416.5; 96/207, 215, 220; 95/243, 262

[56] References Cited

U.S. PATENT DOCUMENTS

| | | |
|---|---|---|
| 4,139,464 | 2/1979 | Coward . |
| 4,366,069 | 12/1982 | Dudrey et al. . |
| 5,244,586 | 9/1993 | Hawkins et al. . |
| 5,368,747 | 11/1994 | Rymal, Jr. et al. . |
| 5,409,618 | 4/1995 | Price . |
| 5,484,534 | 1/1996 | Edmondson . |
| 5,599,457 | 2/1997 | Fanning et al. . |

OTHER PUBLICATIONS

Tooling & Production Fluid Recycling $ystems (sic) Make Sense, Save Dollars, Hawks, Feb. 1998.

The Outside Edje Cleaning Your Machine Sump Edjean Technical Services, Inc., Mar. 1997.

Mini Toss Tramp Oil Separator EdjeTech Services, Unknown.

T.O.R.S. Tramp Oil Removal Systems Mechanically Emulsified Oil Removal TSP, Unknown.

Tramp Oil Separator The Economical Solution to Tramp–Oil Problems Hyde Products, Inc., Unknown.

*Primary Examiner*—Robert Popovics
*Attorney, Agent, or Firm*—Edward L. White

[57] ABSTRACT

An apparatus and method for separating a first liquid phase from second liquid phase and entrained air and solids. More particularly, the apparatus removes tramp oil, metal shavings and other solids from coolant used in metal-working machines. The apparatus can also be used to remove air and solids from a single liquid phase. The apparatus is compact and simple to use. It overcomes many of the disadvantages of prior art devices, including their tendency to become plugged with oily material.

16 Claims, 5 Drawing Sheets

APPARATUS AND METHOD FOR COOLANT/TRAMP OIL SEPARATION

CROSS REFERENCES TO RELATED APPLICATIONS

None.

BACKGROUND OF THE INVENTION a. Field of the Invention

The invention relates to devices to remove undesirable solids and, generally, to remove a second separate liquid phases from a first liquid phase. More specifically, the invention relates to devices to separate metal cuttings and other solids as well as machine oil from coolant to render the coolant suitable for reuse in machining metal parts. Applications include, but are not limited to, processing of coolants from metalworking, metal finishing, screw machines, grinding/lapping, and primary metals such as roll forming, cold heading and stamping.

b. Description of the Prior Art

Machining metal parts generates friction and, consequently, heat. This heat and friction tend to wear out the cutting implements used to machine metal parts. Therefore, it has long been the practice to use lubricating oils (also known as way lube) to reduce the friction of moving machine parts and to spray coolants on the workpiece to dissipate the heat generated. The coolant sprayed on the workpiece being machined also carries away metal shavings and lubricating oil. Metal shavings carried away by the coolant are known as "swarf," and lubricating oil picked up by the coolant is known as "tramp oil." The oil and coolant form an emulsion, not a mixture. The oil and water remain in separate phases. Upon standing the lighter oil phase tends to rise to the top and the heavier coolant phase tends to settle to the bottom of a vessel. The oil phase covering the coolant creates an anaerobic environment promoting the growth of anaerobic bacteria. Growth of anaerobic bacteria causes the pH of the coolant to drop, i.e., become more acidic. Acidic coolant dissolves, to some extent, metals from the cutting tools and workpieces upon which it is sprayed. This dissolving of cutting tools and workpieces causes wear of the cutting tools and surface degradation of workpieces. In addition, some of the metallic ions dissolved are heavy metals which present health hazards to workers.

Systems for removing swarf and tramp oil from coolant are well known. Systems are commercially available from EdjeTech Services, Inc., Hyde Products, Inc. Total System Partnership and others. U.S. Pat. No. 5,599,457 to Fanning et al. discloses a machine coolant treatment method. The method comprises the following steps: (1) passing the coolant through an oil absorbent filter to produce a first filtrate free of tramp oil; (2) passing the filtrate through a particle filter to producer a second filter to produce a second filtrate substantially free of particulate matter; and (3) passing the second filtrate through at least one porous metal sponge-like structure formed of metal particles bound together in an interconnected form to produce a coolant free of tramp oil, particulate matter and dissolved heavy metals. The pH and bacterial growth are controlled by passage of the coolant through the porous metal sponge-like structure. The problem with Fanning's invention is that the oil absorbent filter and particle filter have to be regularly cleaned or the oil-removing efficiency will be diminished. The oil is removed in the oil absorbent filter, and this oil absorbent filter has a maximum carrying capacity.

U.S. Pat. No. 5,244,586 to Hawkins et al. discloses a machine coolant recycling system. Hawkins teaches the use of a centrifuge to separate the undesirable oil and solids from the coolant. Hawkins, like many of the prior art systems is too complicated to be dedicated to a particular machine within a metal-working shop. Instead, as noted in Hawkins, coolant from each machine's sump was transferred to a central recycling system which typically served a large number of metal-working machines. Hawkins invention is too complicated and bulky to be used for a single metal-working machine, so it would not be practical where a machine shop only had a few metal-working machines or where a central recycling system was for some reason impractical.

SUMMARY OF THE INVENTION

It is an object of the invention to provide an apparatus for coolant/tramp oil separation which overcomes many of the disadvantages of the prior art. In particular, it is an object of the invention to provide an apparatus for coolant/tramp oil separation which is compact enough to be used with a single metal-working machine, and portable so that it can be moved from machine to machine. Another object of the invention to provide an apparatus which is easier to clean than the prior art. A further object of the invention to provide an apparatus which maintains efficient operation even when it is in need of cleaning.

BRIEF DESCRIPTION OF THE DRAWINGS

FIG. 8 is a detail sectional side view of the preferred embodiment of the diffuser and sediment trap.

DESCRIPTION OF PREFERRED EMBODIMENTS

Figure 1:
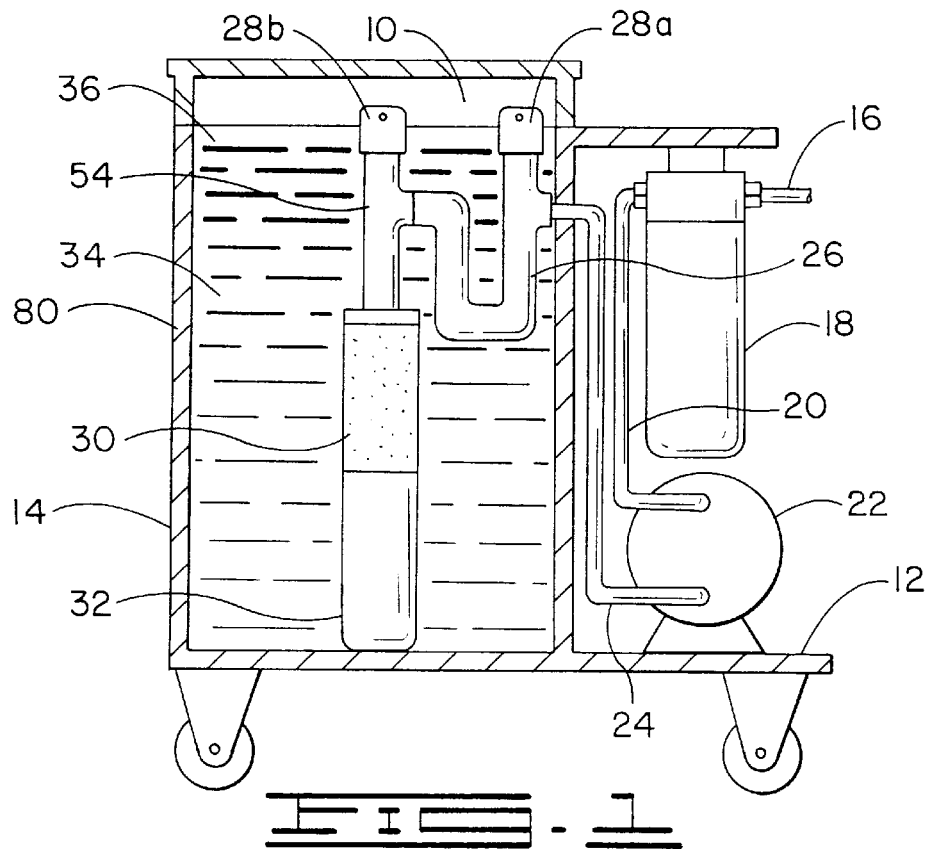
FIG. 1 is a sectional side view along the line 2—2 as shown in FIG. 2.

Referring now to the drawings in detail, wherein like numerals represent like parts, the embodiments of the invention will be described. By describing the preferred embodiment, the invention is not thereby limited. Rather, the scope of the invention will be clear from the specification and the claims.

FIG. 1 shows the apparatus 10 mounted on a support means 12. As shown the support means 12 is a wheeled cart which allows the apparatus 10 to be conveniently moved as needed. The focus of FIG. 1 is on the components used to separate the coolant from the tramp oil, undesirable solids and entrained air. Used coolant from a metal working machine 70 (shown as a part of the overall scheme of use of the apparatus 10 in FIG. 7) enters the system through an inlet line 16 and first passes through a pre-filter 18. The pre-filter 18 removes coarse particles and protects the pump 22 from damage by solid particles. The coolant leaves the pre-filter 18 and passes through a pump inlet line 20 to a pump 22. The pump 22 may be any variety of commercially available pumps. Preferably, the pump 22 would be a diaphragm-type or other similar pump to minimize agitation of the incoming coolant. For example, a centrifugal pump would be undesirable because it would shear the oil droplets and cause the emulsion to be more difficult to separate. The pump 22 could be powered by any number of means including air, electric, hydraulic and the like. Preferably, the pump 22 is driven by air power. The coolant leaves the pump 22 through the pump outlet line 24. The pump outlet line 24 leads through the outer wall 80 of a coolant tank 14 to the p-trap debubbler 26.

Figures 5, 6:
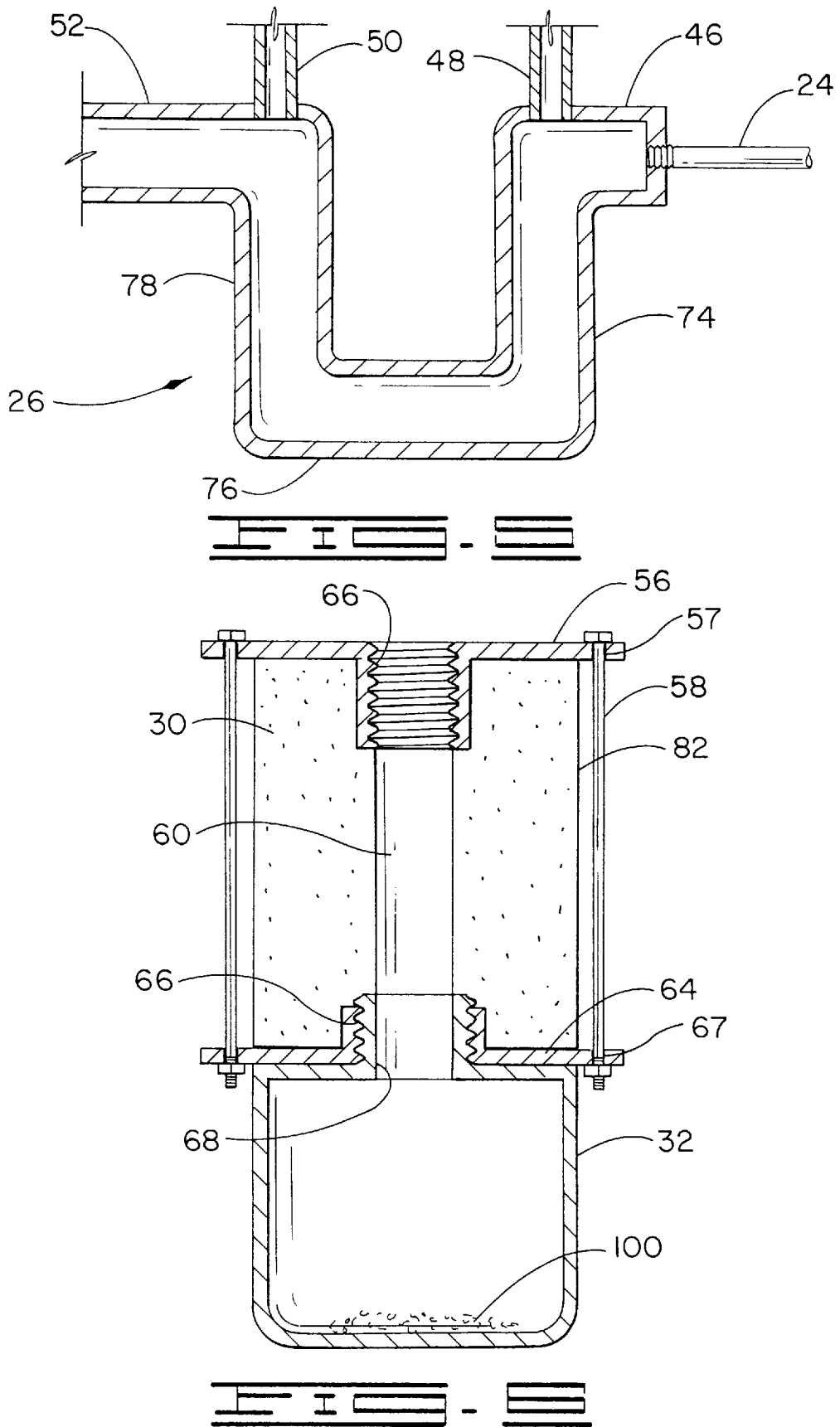
FIG. 5 is a detail sectional side view of the p-trap debubbler.
FIG. 6 is a detail sectional side view of the diffuser and the sediment trap.

Referring to FIG. 5, the p-trap debubbler 26 comprises a u-shaped section of pipe or tubing having an inlet 46, a first vertical portion 74, a horizontal portion 76 and a second vertical portion 78. The p-trap debubbler 26 is shown as a continuous section of pipe or tubing, but it should be understood that the bends could be accomplished with elbows connected to straight pipe other well-known means. The cross section of the p-trap debubbler 26 is substantially larger than the cross section of the pump outlet line 24. Preferably, the cross section of the p-trap debubbler 26 is at least eight times the cross section of the pump outlet line 24. The pump outlet line 24 enters the p-trap inlet 46. The pump outlet line 26 may be connected to the p-trap debubbler with any conventional means including, as shown, a female pipe thread formed within the p-trap inlet 46 mated to male pipe threads on the external portion of the pump outlet line 24. Coolant then passes downwardly through the first vertical portion 74. Located above the first vertical portion 74 is a first p-trap vent line 48. The first p-trap vent line 48 allows air bubbles which coalesce at the top of the first vertical portion 74 to proceed upward to a vent 28a. Coolant then passes through the horizontal portion 76 and enters the second vertical portion 78. Air bubbles continue to coalesce in the second vertical portion 78 and can escape through an optional second p-trap vent line 50 above the second vertical portion 78. Where a second p-trap vent line 50 is included, a second vent 28b will also be included in communication with the second p-trap vent line 50. Alternatively, the second vent 28b may be located as shown in FIG. 1 above the diffuser inlet line. The coolant then exits the p-trap debubbler 26 through the p-trap outlet 52. The diffuser tube inlet line 54 receives the coolant from the p-trap outlet 52 (see FIG. 1).

FIG. 6 illustrates one embodiment of the construction of the diffuser tube 30 and the sediment trap 32. The embodiment of the diffuser tube 30 shown in FIG. 6, will be referred to as the filter sponge configuration. The preferred embodiment, however, is shown in FIG. 8, and referred to as the "pipe-within-a-pipe" configuration. The embodiment in FIG. 8 is preferred over the embodiment in FIG. 6 because the diffuser tube 30 in FIG. 6 tends to clog and reduce the efficiency of the apparatus, while the "pipe-within-a-pipe" construction shown in FIG. 8 tends to resist clogging and consequent reduction in efficiency.

As shown in FIG. 6, a top plate 56 is located at an upper end of the diffuser tube 30. The top plate 56 is constructed of steel, rigid plastic or other suitable material. It includes a female coupling 66 located at or near its center. It also defines a plurality of holes 57 along its periphery adapted to receive retainer bolts 58. The retainer bolts 58 pass through the holes 57 and run parallel to the outer surface 82 of the diffuser tube 30 continuing through a plurality of matching holes 67 in a bottom plate 64 located below the diffuser tube 30. Pressure from tightening the retainer bolts 58 holds both the top plate 56 and bottom plate 64 securely against the diffuser tube 30. The diffuser tube inlet line 54 has one end (not shown) adapted to matingly connect with the female coupling 66. As shown, diffuser inlet line 54 would have male pipe threads to be matingly received within the female coupling 66. Similarly, the bottom plate 64 includes a female coupling 66 at or near its center. It should be understood that the means used to hold the top and bottom plates 56, 64 onto the diffuser tube 30 is not a critical element of the invention. The plates 56, 64 may be pressed, glued, welded, or otherwise held in contact with the diffuser tube 30. An inner passage 60 is defined within the diffuser tube 30. The coolant passes down through the inner passage 60, then diffuses outwardly through the diffuser tube 30 toward the outer surface 82 of the diffuser tube 30. A sediment trap 32 is matingly attached to the bottom plate 64. The sediment trap 32 has a male coupling 68 at its upper end adapted to be matingly received within the female coupling 66 in the bottom plate 64. Particulate matter 100 entering the inner passage 60 with the coolant is forced toward the sediment trap 32 as coolant flows downwardly and out through the diffuser tube 30. Periodically, as the sediment trap 32 must be removed to clean out the built up particulate matter 100. In this embodiment, the diffuser tube 30 may be made of numerous materials including metal particles bound together in a sponge-like structure, a plastic or rubber porous matrix, or a ceramic porous matrix. The diffuser tube at any rate defines a multiplicity of small, random passageways therethrough from the inner passage 60 to the outer surface 82. As disclosed in U.S. Pat. No. 5,599,457 to Fanning et al. a metal sponge-like structure provides the additional benefit of removing heavy metals from the coolant and controlling the pH thereof.

The preferred embodiment of the diffuser tube 30 is shown in FIG. 8. In FIG. 8, the diffuser tube 30 is shown as more than one concentric pipe 84, 86 with a multiplicity of small holes drilled or otherwise penetrating therethrough 88, 92 to allow coolant to diffuse smoothly into the coolant tank 14. As shown in FIG. 8, when the concentric pipe configuration is used, a smaller pipe 84 is disposed within at least one larger pipe 86. Preferably, the smaller pipe has a multiplicity of small holes 88 defined in a lower portion 90 of its length. The larger pipe 86 has a multiplicity of holes 92 defined in its upper portion 94 so that the coolant flows upwardly in the annular space 96 defined between the smaller 84 and larger pipe 86, thence out through the multiplicity of holes 92 in the larger pipe 86 into the coolant tank 14. Additional larger pipes (not shown) may be added to repeat this counterflow arrangement. That is, one or more additional pipe(s) could encircle the larger pipe 86 creating yet another annular space, not shown. A removable small pipe cap 98 needs to have holes 99 defined therein to allow sediment 100 to flow therethrough. A cap 102 encloses the upper portion 94 of the larger pipe 86. As shown, the cap 102 threadedly engages the upper portion 94. The cap 102 includes a threaded port 104 through which the smaller pipe 84 passes. A seal between the cap 102 and the smaller pipe 84 is achieved by use of a collar 108 which compresses a sealing means 106 (as shown, an o-ring). A lower portion 110 of the larger pipe 86 is also enclosed by a lower cap 112 which threadingly engages the larger pipe 86. Once the sediment 100 passes through the holes 99 in the small pipe cap 99, it settles on the lower cap 112. In this embodiment of the diffuser tube 30, the lower cap and the annular space function as the sediment trap 32. The caps 102, 112 could engage the larger pipe by any conventional means such as welding, gluing, or (as shown) threads. Alternatively, the small pipe could pass through the lower cap so that the small pipe cap 98 can be removed to clean sediment without removing the lower cap 112. It may also be beneficial to provide a vent (not shown) when this configuration of the diffuser tube 30 is used to allow air, which may collect in the annular space 96, to escape.

It may be preferable in some applications to use both the filter sponge and pipe-within-a-pipe configurations of the diffuser tube 30. In those applications, the coolant would first pass through the pipe-within-a-pipe diffuser tube. After most of the sediment 100 had been removed by the pipe-within-a-pipe diffuser tube, the coolant would enter the filter sponge diffuser tube. As noted, the filter sponge configuration offers the additional benefit (when a metal sponge is used) of removing heavy metals from the coolant and controlling its pH.

Once the coolant passes through the diffuser tube 30 it enters the coolant tank 14. The cleaned coolant settles into a coolant layer 34 below a tramp oil layer 36. Preferably, the entire p-trap debubbler 26, diffuser tube 30, and sediment trap 32 are submerged within the coolant tank 14. Locating this equipment in the tank minimizes the amount of space required for the apparatus 10. However, it is obvious that the p-trap debubler 26 and the sediment trap 32 could easily be located outside the coolant tank 14. The diffuser tube 30 could also be located outside the coolant tank 14, but that would to some extent defeat one of the objects of the invention which is to ensure smooth flow of the coolant into the coolant tank 14 to maximize separation of the air bubbles, tramp oil and coolant. The diffuser tube 30 is, in the preferred embodiment, disposed within the coolant tank 14.

Figure 2:
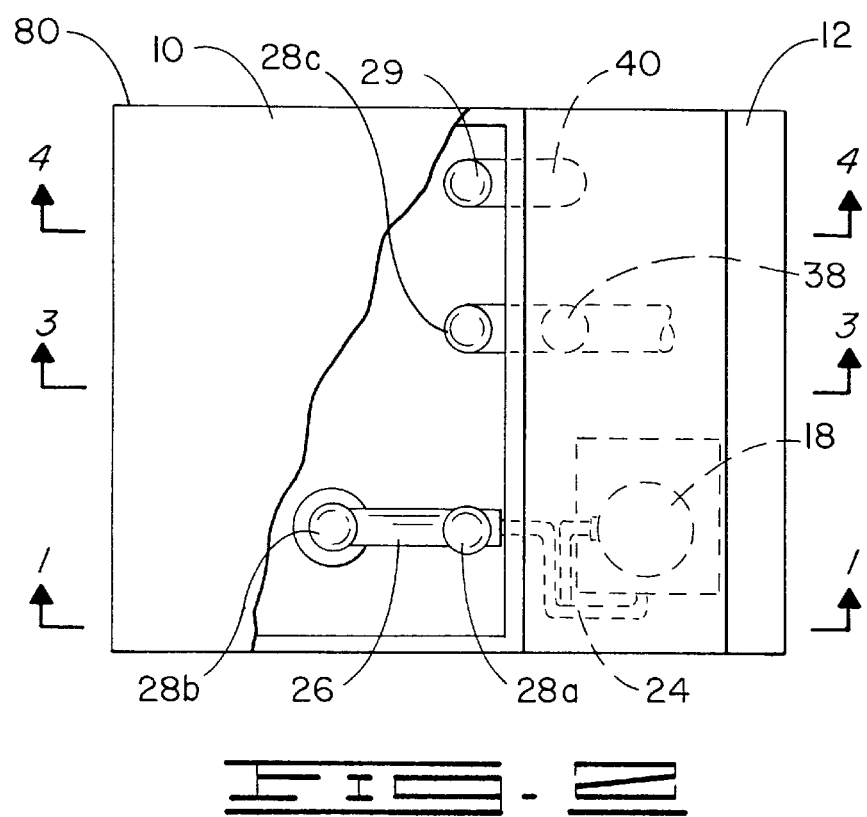
FIG. 2 is a top view.
Figure 3:
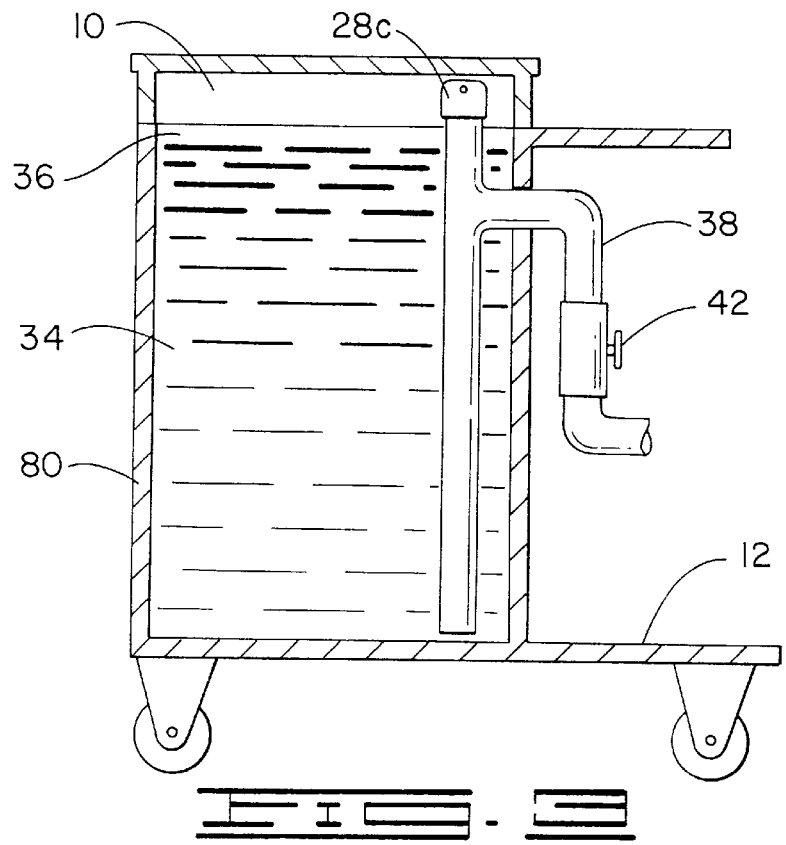
FIG. 3 is a sectional side view along the line 3—3 as shown in FIG. 2.

FIG. 2 shows a top view of the apparatus 10. This view illustrates the location of a coolant return line 38 and a tramp oil outlet 40 in relation to the above-described parts of the apparatus 10. The coolant return line 38 draws coolant from the bottom of the coolant tank 14 as shown in FIG. 3. As shown, a vent 28c is disposed above the coolant return line 38. The vent 28c prevents coolant from being siphoned out of the coolant tank 14, when the apparatus 10 is not in use. The coolant return line 38 passes through the exterior wall 80 of the coolant tank 14. Thence the coolant return line 38 may (in some applications) pass through a return pump 72 (see FIG. 7) and thence to the metal-working machine 70. The return pump 72 is not necessary for a compact, stand-alone unit, which is the preferred embodiment of the invention. However, if the invention were being used for a number of metal-working machines, it might be necessary to have a return pump 72 to get the used coolant back to the coolant tank 14.

Figure 4:
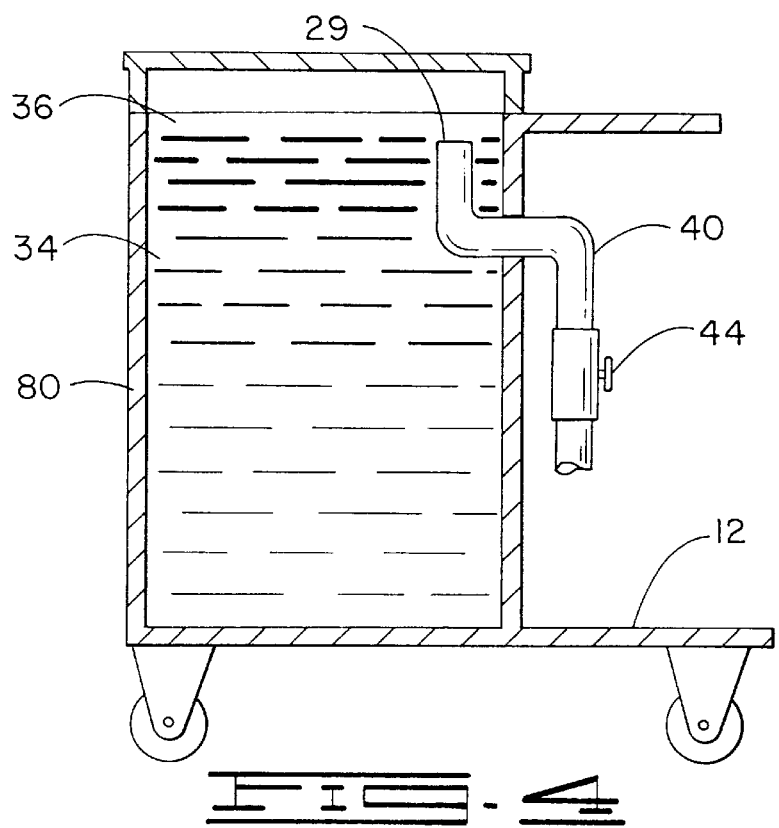
FIG. 4 is a sectional side view along the line 4—4 as shown in FIG. 2.

FIG. 4 shows that the tramp oil outlet 40 skims tramp oil from the tramp oil layer 36 at the top of the coolant tank 14. As shown, a inlet 29, disposed below the surface of the tramp oil layer 36 allows tramp oil to flow into the tramp oil outlet 40. The tramp oil outlet 40 passes through the exterior wall 80. Both the tramp oil outlet 40 and the coolant return line 38 are shown with valves—coolant outlet valve 42 and tramp oil outlet valve 44—which allow the flow of coolant or tramp oil to be stopped. Alternatively, the apparatus 10 may include a skimmer pump as shown in the marketing materials and used with Edje Tech Services' Mini Toss Tramp Oil Separator, incorporated herein by reference. As a further alternative, a suction skimmer as shown and disclosed in U.S. Pat. No. 5,599,457 to Fanning et al. may be employed.

Figure 7:
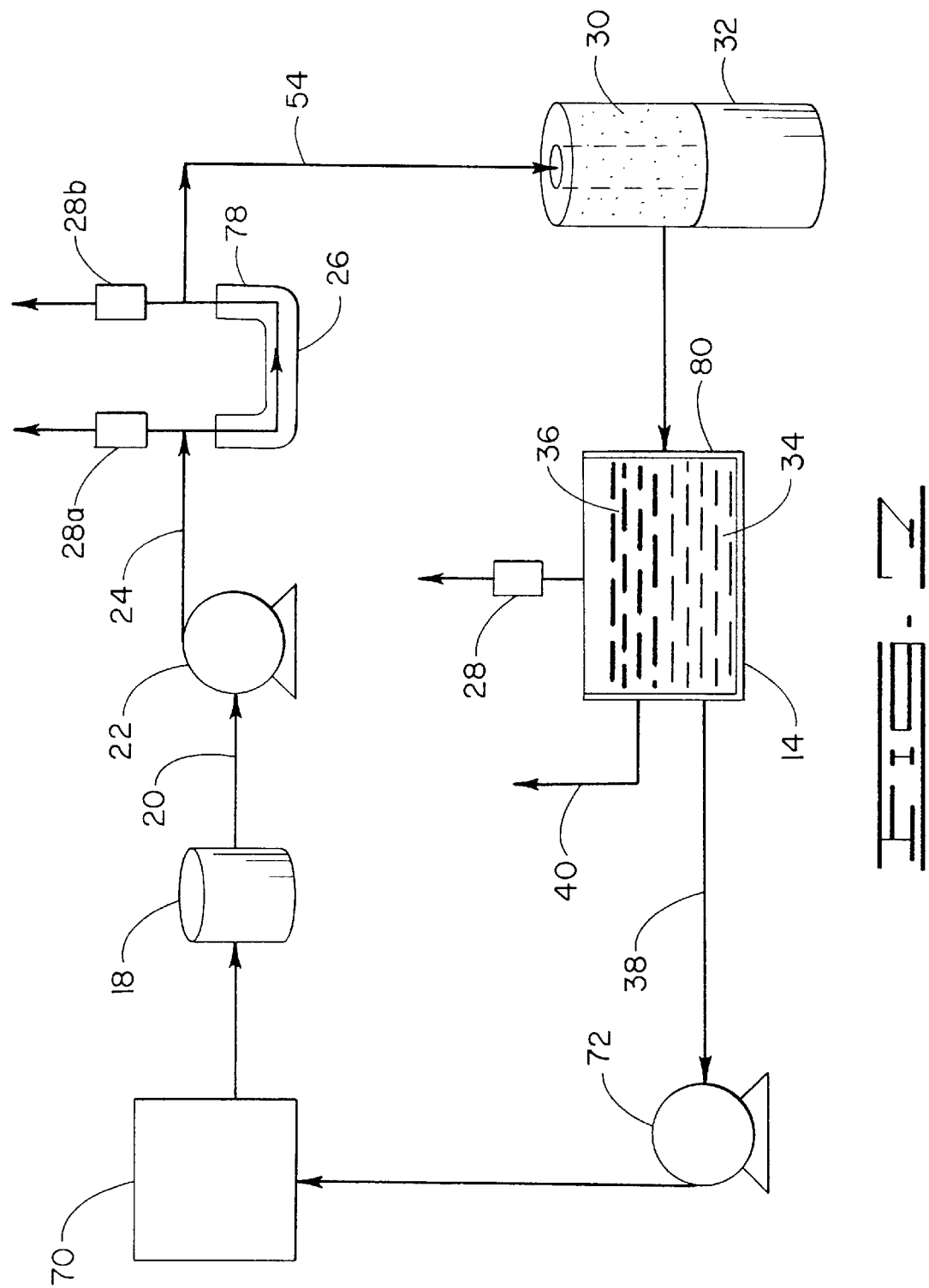
FIG. 7 is a illustrative flow-chart of the apparatus.
Figure 9:
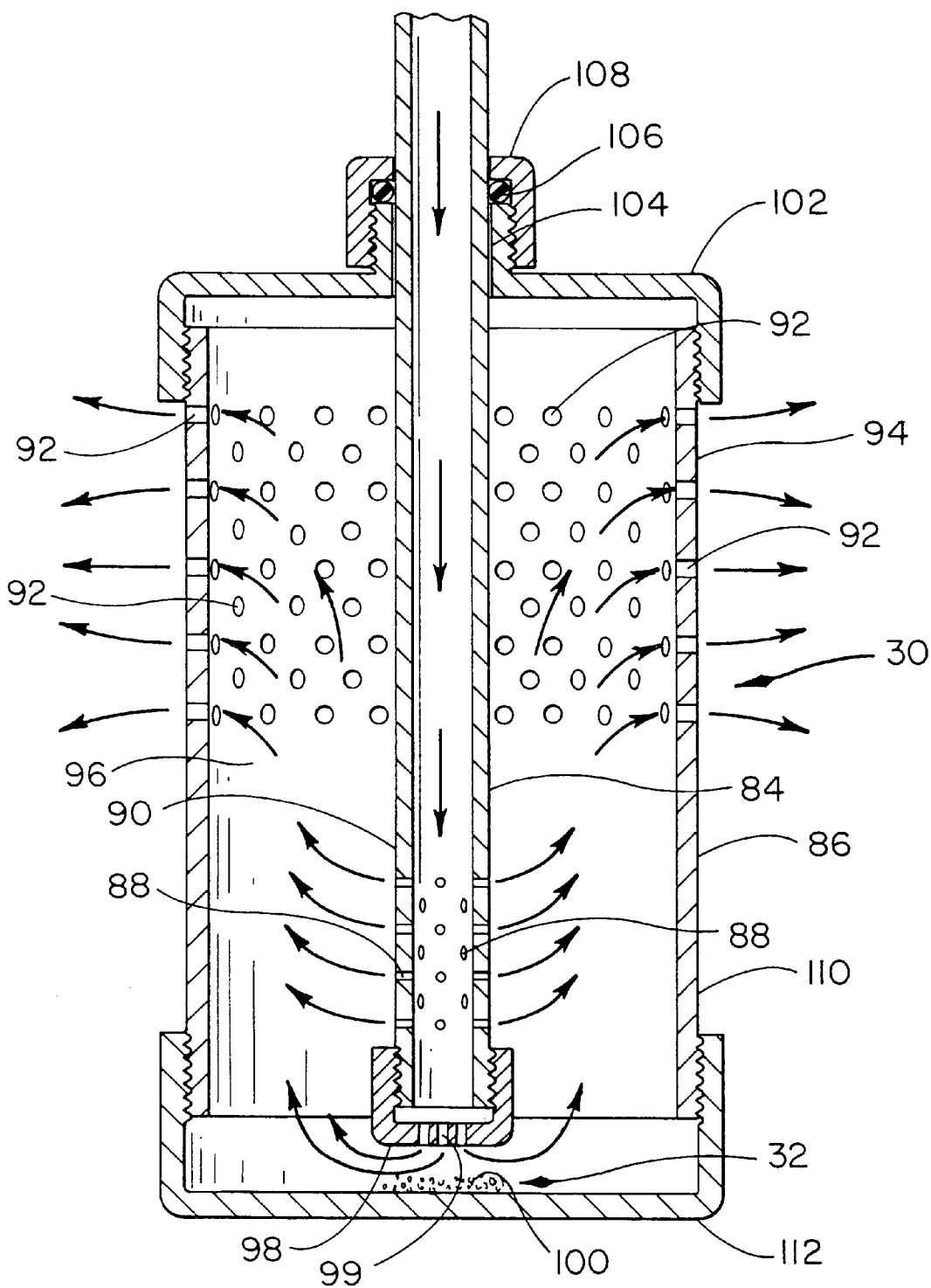

The operation of the apparatus 10 is explained with reference to FIG. 7. Contaminated coolant from a metal-working machine 70 enters the pre-filter 18, thence through the pump inlet line 20 to a pump 22. The pre-filter 18 removes larger solid particles to prevent damage to the pump 22. The pump 22 forces the coolant through the pump outlet line 24 into a p-trap debubbler 26. The u-shape and relatively large cross section of the p-trap debubbler 26 allows entrained air to migrate upwardly and exit the system through vents 28a and 28b. The large cross section of the p-trap debubbler 26 causes the coolant to flow more slowly through the p-trap debubbler 26. The migration of the air is further enhanced in the second vertical portion 78 of the p-trap debubbler 26 because the coolant is already traveling in an upward direction, so the air bubbles are not "fighting the current." The low-velocity flow in the p-trap debubbler 26 also allows the tramp oil and coolant phases to begin separating. This separation is further enhanced by the u-shape of the p-trap debubbler 26. Prior art devices did not include an analog to the p-trap debubbler 26. The p-trap debubbler 26 is new in light of the prior art and produces unexpected results regarding disengagement of air bubbles and separation of the phases.

After exiting the p-trap debubbler 26, the coolant enters the diffuser inlet line 56 and then passes to the inner passage 60 of the diffuser tube 30. The fluid flows downwardly through the inner passage 60. As it flows downwardly it diffuses out through the diffuser tube 30. The laminar flow pattern in the diffuser tube 30 encourages separation of the tramp oil and coolant phases. The generally downward nature of the flow pattern encourages particles 100 to settle out into the sediment trap 32. The laminar flow also causes the coolant to enter the coolant tank 14 in a manner conductive to separation of the phases. For sake of illustration, the diffuser tube 30 is shown outside the coolant tank 14, but in the preferred embodiment, the diffuser tube 30 would be fully submerged in the coolant tank 14. The apparatus 10, and particularly the portion of the apparatus from the p-trap inlet 52 to the diffuser tube 30, is designed to maintain smooth laminar flow to encourage disengagement of air bubbles and separation of the tramp oil and coolant phases. The smooth laminar introduction of the coolant into the coolant tank 14 ensures that the coolant layer 34 tramp oil layer 36 in the coolant tank 14 are not disturbed and remain separate and distinct.

Tramp oil is skimmed from the coolant tank 14 and sent for disposal and the cleaned coolant is drawn from the bottom of the coolant tank 14 and returned through a coolant return line 38 to an optional return pump 72 or a machine sump tank (not shown). Thence the cleaned coolant is returned to the metal-working machine for reuse.

Variations in the construction, assembly and usage of this invention may occur to those skilled in the art upon reviewing the subject matter of the invention. Any such variation or modifications, if within the spirit of this invention, are intended to be encompassed within the scope of any claims to patent protection issuing hereon. The description of the preferred embodiment set forth herein is done for illustrative purposes only.

Having thus described the invention, I claim:

1. An apparatus for separating two fluid phases and entrained air and solids comprising:

a. a pre-filter adapted to remove solid particles from a fluid mixture containing an first liquid phase, a second liquid phase, and entrained solids and air;

b. a pump following the pre-filter in hydraulic communication with the pre-filter;

c. a p-trap debubbler following the pump and in hydraulic communication therewith, the debubbler having an inlet, a first vertical portion, a horizontal portion, a second vertical portion, and an outlet, the cross-section of the debubbler being sufficient to slow the flow of the fluid so that the liquid phases and entrained air begin to disengage;

d. a diffuser tube following the p-trap debubbler and in hydraulic communication therewith, the diffuser tube having a substantially vertical alignment and defining therein an inner passage, the diffuser further defining a multiplicity of small random passageways therethrough, so that when the fluid enters the diffuser tube it flows downwardly through the inner passage and thence outwardly through the passageways;

e. a sediment trap disposed below the diffuser tube and in hydraulic communication therewith which allows solids entrained in the fluid to pass downward and be captured within the sediment trap as the fluid phases pass out through the diffuser tube;

f. a coolant tank containing a quantity of fluid separated into a first and a second liquid phase, the diffuser tube being substantially submerged under the fluids within the coolant tank;

g. a return line for collecting the first liquid phase from the coolant tank and returning it to be reused in a process;

h. skimming means for removing the second liquid phase from the coolant tank; and i. air escape means in communication with the p-trap debubbler for allowing entrained air to exit the apparatus;

whereby the fluid mixture is separated into its component parts and the first liquid phased is prepared for reuse in a process.

2. A method for separating two fluid phases and entrained air and solids comprising the following steps:
 a. providing the apparatus of claim 1;
 b. supplying a fluid mixture containing an first liquid phase, a second liquid phase, and entrained solids and air to the pre-filter;
 c. allowing the fluid mixture to pass through the apparatus; and
 d. returning the cleaned first liquid phase to be reused in a process.

3. An apparatus according to claim 1, wherein the pump is a diaphragm pump which minimizes the amount of agitation of the fluid entering the apparatus.

4. An apparatus according to claim 1, wherein the diffuser tube is composed of metal particles bound together in an interconnected form of a porous metal, spongy structure.

5. An apparatus according to claim 1, wherein the diffuser tube is composed of ceramic particles bound together in an interconnected form of a porous ceramic, spongy structure.

6. An apparatus according to claim 1, wherein the diffuser tube is composed of rigid particles bound together in an interconnected form of a porous plastic, spongy structure.

7. An apparatus according to claim 1, wherein the diffuser tube includes at least two pipes, a larger and a smaller, both having an upper and a lower section and an interior and an exterior, the smaller being disposed within the larger, there being fluid communication from the interior of the smaller to the exterior of the smaller via a multiplicity of holes defined in the lower section of the smaller pipe, there further being communication from the interior of the larger pipe with the exterior of the larger pipe via a multiplicity of holes defined in the upper section of the larger pipe, the larger pipe having a removable end cap enclosing the lower portion to allow a user to easily remove sediment which deposits in the lower section of the larger pipe.

8. The apparatus of claim 1 further comprising:
 a. the diffuser tube including at least two pipes, a larger and a smaller, both having an upper and a lower section and an interior and an exterior, the smaller being disposed within the larger, there being fluid communication from the interior of the smaller to the exterior of the smaller via a multiplicity of holes defined in the lower section of the smaller pipe, there further being communication from the interior of the larger pipe with the exterior of the larger pipe via a multiplicity of holes defined in the upper section of the larger pipe, the larger pipe having a removable end cap enclosing the lower portion to allow a user to easily remove sediment which deposits in the lower section of the larger pipe; and
 b. a second diffuser tube composed of metal particles bound together in an interconnected form of a porous metal, spongy structure, the second diffuser tube being disposed between the first diffuser tube and the coolant tank so as to further separate the two phases and recondition the coolant.

9. An apparatus for separating a fluid phase and entrained air and solids comprising:
 a. a pre-filter adapted to remove solid particles from a fluid mixture containing a liquid phase, entrained solids and air;
 b. a pump following the pre-filter in hydraulic communication with the pre-filter;
 c. a p-trap debubbler following the pump and in hydraulic communication therewith, the debubbler having an inlet, a first vertical portion, a horizontal portion, a second vertical portion, and an outlet, the cross-section of the debubbler being sufficient to slow the flow of the fluid so that the entrained air begins to disengage;
 d. a diffuser tube following the p-trap debubbler and in hydraulic communication therewith, the diffuser tube having a substantially vertical alignment and defining therein an inner passage, the diffuser further defining a multiplicity of small random passageways therethrough, so that when the fluid enters the diffuser tube it flows downwardly through the inner passage and thence outwardly through the passageways;
 e. a sediment trap disposed below the diffuser tube and in hydraulic communication therewith which allows solids entrained in the fluid to pass downward and be captured within the sediment trap as the fluid phases pass out through the diffuser tube;
 f. a coolant tank containing a quantity of fluid, the diffuser tube being substantially submerged under the fluid within the coolant tank;
 g. a return line for collecting the liquid phase from the coolant tank and returning it to be reused in a process;
 h. air escape means in communication with the p-trap debubbler for allowing entrained air to exit the apparatus;

whereby the fluid mixture is separated into its component parts and the liquid phased is prepared for reuse in a process.

10. A method for separating two fluid phases and entrained air and solids comprising the following steps:
 a. providing the apparatus of claim 9;
 b. supplying a fluid mixture containing an first liquid phase, a second liquid phase, and entrained solids and air to the pre-filter;
 c. allowing the fluid mixture to pass through the apparatus; and
 d. returning the cleaned first liquid phase to be reused in a process.

11. An apparatus according to claim 9, wherein the pump is a diaphragm pump.

12. An apparatus according to claim 9, wherein the diffuser tube is composed of metal particles bound together in an interconnected form of a porous metal, spongy structure.

13. An apparatus according to claim 9, wherein the diffuser tube is composed of ceramic particles bound together in an interconnected form of a porous ceramic, spongy structure.

14. An apparatus according to claim 9, wherein the diffuser tube is composed of rigid particles bound together in an interconnected form of a porous plastic, spongy structure.

15. An apparatus according to claim 9, wherein the diffuser tube includes at least two pipes, a larger and a smaller, both having an upper and a lower section and an interior and an exterior, the smaller being disposed within the larger, there being fluid communication from the interior of the smaller to the exterior of the smaller via a multiplicity of holes defined in the lower section of the smaller pipe, there further being communication from the interior of the larger pipe with the exterior of the larger pipe via a multiplicity of holes defined in the upper section of the larger pipe, the larger pipe having a removable end cap enclosing the lower portion to allow a user to easily remove sediment which deposits in the lower section of the larger pipe.

16. The apparatus of claim 9 further comprising:
   a. the first diffuser tube including at least two pipes, a larger and a smaller, both having an upper and a lower section and an interior and an exterior, the smaller being disposed within the larger, there being fluid communication from the interior of the smaller to the exterior of the smaller via a multiplicity of holes defined in the lower section of the smaller pipe, there further being communication from the interior of the larger pipe with the exterior of the larger pipe via a multiplicity of holes defined in the upper section of the larger pipe, the larger pipe having a removable end cap enclosing the lower portion to allow a user to easily remove sediment which deposits in the lower section of the larger pipe; and
   b. a second diffuser tube composed of metal particles bound together in an interconnected form of a porous metal, spongy structure, the second diffuser tube being disposed between the first diffuser tube and the coolant tank so as to further separate the two phases and recondition the coolant.

* * * * *